United States Patent [19]

Chiba

[11] Patent Number: 5,526,135
[45] Date of Patent: Jun. 11, 1996

[54] VIDEO SIGNAL RECORDING AND/OR REPRODUCING APPARATUS OPERABLE IN NORMAL AND DIFFERENTIAL SPEED PLAYBACK MODES

[75] Inventor: Nobuhiro Chiba, Kanagawa, Japan

[73] Assignee: Sony Corporation, Tokyo, Japan

[21] Appl. No.: 312,178

[22] Filed: Sep. 26, 1994

Related U.S. Application Data

[63] Continuation of Ser. No. 53,269, Apr. 28, 1993, abandoned.

[30] Foreign Application Priority Data

May 11, 1992 [JP] Japan .................... 4-143759

[51] Int. Cl.⁶ ........................... H04N 5/76; H04N 5/78
[52] U.S. Cl. ............................ 358/335; 360/10.1
[58] Field of Search ..................... 358/335, 342, 358/310, 329; 360/32, 10.1; 348/384, 533, 607, 606

[56] References Cited

U.S. PATENT DOCUMENTS

| | | | |
|---|---|---|---|
| 4,746,971 | 5/1988 | Kimura et al. ........................ | 358/31 |
| 4,847,701 | 7/1989 | Suesada ................................ | 358/335 |
| 4,930,024 | 5/1990 | Kanda et al. ........................ | 360/10.1 |
| 5,136,391 | 8/1992 | Minami ................................ | 358/310 |
| 5,196,930 | 3/1993 | Kadono et al. ....................... | 358/133 |
| 5,237,424 | 8/1993 | Nishino et al. ....................... | 358/310 |
| 5,253,122 | 10/1993 | Chiba et al. ......................... | 360/33.1 |

Primary Examiner—Thai O. Tran
Assistant Examiner—Robert Chevalier
Attorney, Agent, or Firm—William S. Frommer; Alvin Sinderbrand

[57] ABSTRACT

A recording and/or reproducing apparatus for grouping input video data at an interval of a predetermined number of pixels and encoding each block by a DCT circuit, a quantization circuit and an entropy encoding circuit, recording the encoded data on a magnetic tape, and reproducing the magnetic tape for producing block-by-block data, which is decoded to produce output video data, includes a filtering circuit for reducing horizontal and vertical frequency components generated by repetitive occurrences of the respective data blocks. For a differential speed playback mode, such as shuttle playback, the video data reproduced and decoded during the differential speed playback mode is passed through the filtering circuit for producing a satisfactory playback image in which block components are suppressed even for the differential speed playback mode.

16 Claims, 17 Drawing Sheets

5,526,135

VIDEO SIGNAL RECORDING AND/OR REPRODUCING APPARATUS OPERABLE IN NORMAL AND DIFFERENTIAL SPEED PLAYBACK MODES

This application is a continuation of application Ser. No. 08/053,269, filed Apr. 28, 1993 now abandoned.

BACKGROUND OF THE INVENTION

This invention relates to a recording and/or reproducing apparatus in which input video data is grouped into blocks each consisting of a predetermined number of pixels and resulting block-by-block data is encoded and recorded on a recording medium, such as a magnetic tape, and in which the recording medium is subsequently reproduced for reproducing block-by-block data and decoding the block-by-block data into output video data.

In a digital VTR for digitizing image signals for recording on a magnetic tape, data compression, that is compression of the picture information, is usually carried out for reducing the quantity of the information recorded on the magnetic tape. That is, in the digital VTR for compressing the image information, input digital video data is grouped into blocks each consisting of a predetermined number of pixels and high efficiency encoding is carried out on the block-by-block basis for compressing the picture information. The data thus compressed by the high efficiency encoding is recorded on the magnetic tape and subsequently reproduced into digital video data by decoding which is the reverse of the operation of high efficiency encoding.

It is noted that if, in the course of reproduction of the data recorded on the magnetic tape with high efficiency encoding, a differential speed reproduction or so-called shuttle playback is performed responsive to the operation of a so-called jog dial, reproduced image, as a result of which the output picture presents a mosaicked appearance to detract from picture quality.

SUMMARY OF THE INVENTION

It is therefore an object of the present invention to provide a recording and/or reproducing apparatus whereby a playback picture may be produced in which block components may be rendered less outstanding for a differential speed playback mode.

The present invention consists in a recording and/or reproducing apparatus in which input video data are grouped into blocks each consisting of a predetermined number of samples and encoded and recorded on a recording medium on the block-by-block basis, and in which the data of each of these blocks, obtained by reproducing the recording medium, is decoded to produce output video data. The apparatus includes filter means for diminishing frequency components produced in the horizontal and vertical directions by repetitive occurrences of the blocks. For a differential speed playback mode, the video data reproduced and decoded for the differential speed playback mode is passed through the filtering circuit.

The filter circuit includes a comb filter capable of reducing horizontal and vertical frequency components generated by repetitive occurrences of the blocks, and the video data reproduced and decoded for the differential speed playback mode is passed through the comb filter.

The filter circuit may also include a comb filter capable of reducing frequency components other than those generated in the horizontal and vertical directions by repetitive occurrences of the blocks, that is, a filter having characteristics opposite to those of the above-mentioned comb filter capable of reducing the horizontal and vertical frequency components, and an output of the comb filter having the opposite characteristics may be subtracted from video data reproduced and decoded for the differential speed playback mode.

The filter circuit may also include a horizontal comb filter capable of reducing frequency components other than those generated in the horizontal direction by repetitive occurrences of the blocks, that is a filter having characteristics opposite to those of the above-mentioned comb filter capable of reducing the horizontal frequency components produced by repetitive occurrences of the blocks, and a vertical comb filter capable of reducing frequency components other than those generated in the vertical direction by repetitive occurrences of the blocks, that is a filter having characteristics opposite to those of the above-mentioned comb filter capable of reducing the vertical frequency components produced by repetitive occurrences of the blocks. The video data reproduced and decoded for the differential speed playback data and passed through one of the horizontal comb filter and the vertical comb filter at least twice may be subtracted from the video data reproduced and decoded for the differential speed playback mode. The resulting data may be passed through the other of the horizontal comb filers and the vertical comb filter at least twice and subtracted from the same data which have not been passed through the other of the horizontal comb filer and the vertical comb filter in this manner.

With the recording and/or reproducing apparatus of the present invention, data obtained by passing the video data reproduced and decoded for the differential speed playback mode may be mixed with data obtained by not passing the video data through the comb filter.

The recording and/or reproducing apparatus of the present invention may include, as block component detection means for detecting the possible presence of block components in the horizontal and vertical directions of video data reproduced and decoded for the differential speed playback mode, an edge difference detection circuit for finding the sum of differences between adjacent samples of blocks, adjacent to each other in an edge-to-edge relation, of the video data reproduced and decoded for the differential speed playback mode, mixing ratio decision means for deciding, based on the sum of the differences from the edge difference detection means, a mixing ratio of the video data reproduced and decoded for the differential speed playback mode and the decoded data passed through the filter means after decoding, and mixing means for mixing, based on the mixing ratio from the mixing ratio decision means, the video data reproduced and decoded for the differential speed playback mode and the video data decoded and passed through the filter means after decoding.

With the recording and/or reproducing apparatus according to the present invention, a field difference detection circuit for finding the sum of the differences of different field components of the same block of the decoded video data, that is the sum of the differences between respective samples of the current field of a block and the corresponding samples of the directly preceding field in the same block, is provided as a block still state detection means for detecting the still state of the portions of the video data reproduced and decoded for the differential speed playback mode which are contained in the block. In this case, the mixing ratio is decided using the sum of the differences supplied from the field difference detection circuit.

With the recording and/or reproducing apparatus according to the present invention, the mixing ratio may also be decided using the sum of the differences from the edge difference detection means and the sum of the differences from the field difference detection circuit.

That is, with the recording and/or reproducing apparatus according to the present invention, the block frequency is reduced by the comb filter for rendering the block frequency components during playback for the differential speed playback mode less apparent. The block frequencies are harmonics of the fundamental frequencies of the block in both the horizontal and vertical directions. Thus the comb filter reduces the block frequencies. Among the comb filters are a comb filter reducing the harmonics of the fundamental frequencies in their entirety, a filter reducing solely the fundamental frequencies, and a filter reducing a fraction of the harmonics, such as odd harmonics.

The recording and/or reproducing apparatus according to the present invention in which input video data are grouped into odd-numbered samples and even-numbered samples each consisting of a predetermined number of pixels, and encoded and recorded on a recording medium on the block-by-block basis, and in which the data of each of the blocks, obtained by reproducing the recording medium, is decoded and the odd-numbered samples and the even-numbered samples are mixed together to produce output video data, comprises, as filter means for reducing lattice-shaped frequency components generated by mixing the blocks of the odd-numbered samples and the blocks of the even-numbered samples, a low-pass filter having a cut-off frequency slightly lower than the Nyquist frequency. The video data reproduced and recorded during a differential speed playback mode are passed through the filter means for the differential speed playback mode.

With the above-described recording and/or reproducing apparatus, the low-pass filter having a cut-off frequency slightly lower than the Nyquist frequency and the above-mentioned comb filter are employed. For the differential speed playback mode, the video data reproduced and decoded for the differential speed playback mode is passed through the low-pass filer, and the data passed through the low-pass filter are also passed through the comb filter.

Meanwhile, for the differential speed playback mode, video data reproduced and decoded for the differential speed playback mode may be passed through the low-pass filter, while the data passed through the low-pass filter may be passed through the comb filter and video data mixing may be carried out as mentioned above.

With the recording and/or reproducing apparatus according to the present invention, the block frequency components may be rendered less apparent by reducing the block frequency components contained in the data reproduced for the differential speed playback mode by passing the data through the comb filter.

Also the latticed frequency components from data reproduced by playback for the differential playback mode are reduced by the low-pass filter for rendering the latticed frequency components less apparent.

Other objects and advantages of the present invention will be apparent from the following description of the preferred embodiments and the claims.

DETAILED DESCRIPTION OF THE PREFERRED EMBODIMENTS

Figure 1:
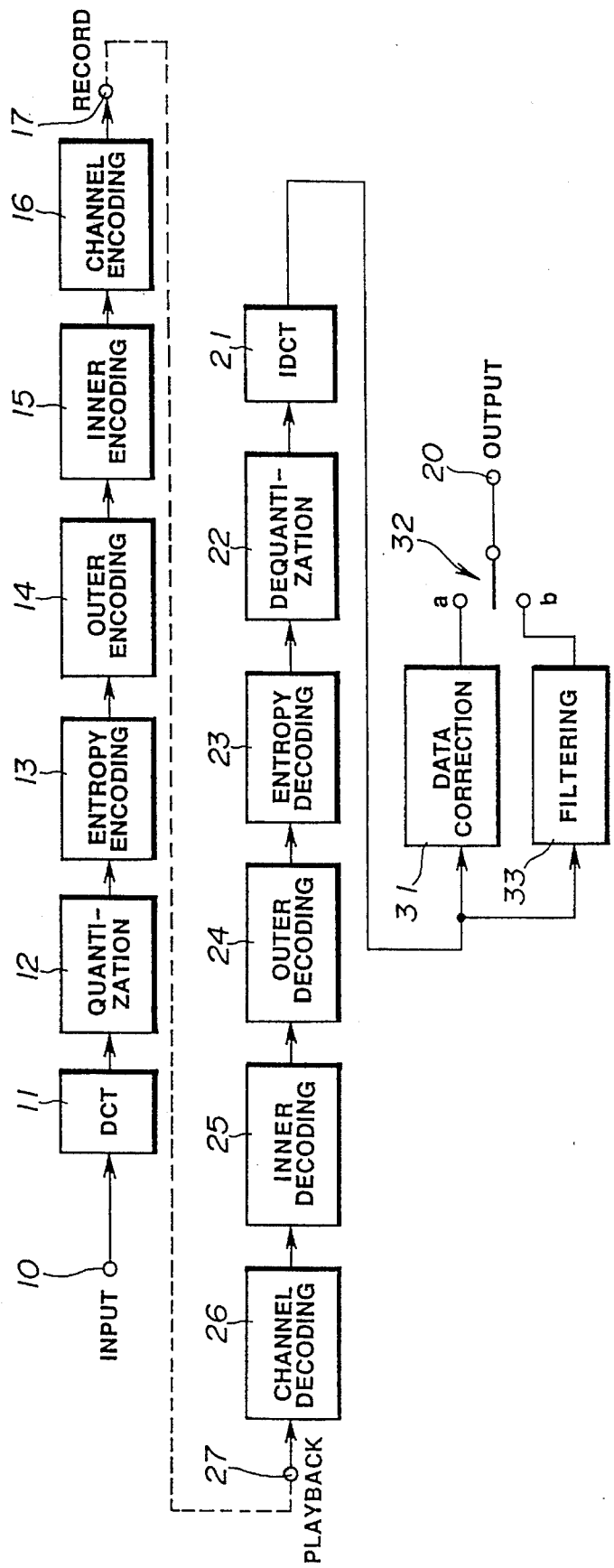
FIG. 1 is a schematic block circuit diagram showing an arrangement of a video signal recording and/or reproducing apparatus according to a first embodiment of the present invention.

Referring to the drawings, preferred embodiments of a video signal recording and/or reproducing apparatus according to the present invention.

Figure 2:
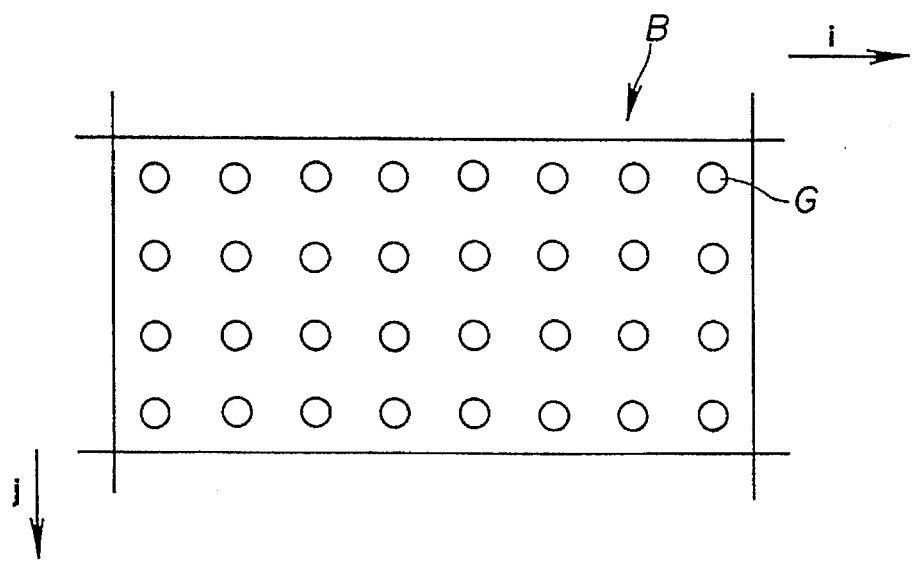
FIG. 2 is a diagrammatic view showing a block of input digital data.

FIG. 1 shows a schematic arrangement of a recording and/or reproducing apparatus according to the present invention. With the recording and/or reproducing apparatus according to the present invention, input digital video data are grouped into plural blocks, such as a block B, each consisting of four vertical lines each consisting of eight horizontal samples of pixels G, as shown in FIG. 2. These video data are encoded block by block and recorded on a magnetic tape so as to be subsequently reproduced into block-by-block data which is decoded to output video data. A filtering circuit 33 is provided for reducing frequency components produced by repetitive occurrences of the blocks in the horizontal and vertical directions. For differential speed playback mode, such as the above-mentioned shuttle playback, the video data reproduced and decoded with the differential speed playback mode is passed through the filtering circuit 33.

That is, on the recording side of the recording and/or reproducing apparatus, shown in FIG. 1, digital video data supplied to an input terminal 10 is transmitted to a differential cosine transform (DCT) circuit 11. The DCT circuit 11 groups the input digital video data into blocks at the interval of the four vertical lines and the eight horizontal samples to perform DCT from block to block to find the correlation. Output data from DCT circuit 11, that is the DCT coefficient data, is supplied to a quantization circuit 12 which quantizes the data so that a smaller number of bits is allocated to data exhibiting low correlation. Output data from the quantization circuit 12 are supplied to an entropy encoding circuit 13 which encodes the data by variable length encoding, such as Huffman coding. High efficiency encoding is achieved by the operation by DCT circuit 11, quantization circuit 12 and entropy encoding circuit 13.

Output data from the entropy encoding circuit 13 are shuffled from block to block and transmitted to a channel encoding circuit 16 after error correction code data are appended thereto by an outer encoding circuit 14 and an outer encoding circuit 15. An encoding suited to recording is performed in the channel encoding circuit 16, output data of which is transmitted via output terminal 17 so as to be recorded on a video tape by downstream circuitry inclusive of a recording amplifier and a recording head.

On the playback side of the recording and/or reproducing apparatus, shown in FIG. 1, playback data transmitted via a playback head and a playback amplifier, not shown, is transmitted via a terminal 27 and a channel decoding circuit 26, which performs an operation which is the reverse of the encoding operation performed by the channel encoding circuit 16 on the recording side, and is error-corrected and deshuffled by an inner decoding circuit 25 and an outer decoding circuit 24 so as to be transmitted to a high efficiency decoding circuitry downstream of an entropy decoding circuit 22.

The entropy decoding circuit 23 performs a decoding which is the reverse of the encoding operation performed by the entropy encoding operation. A dequantization circuit 22 performs a dequantization operation which is the reverse of the quantization performed by the quantization circuit 12, while an IDCT circuit 21 performs an inverse DCT operation which is the reverse of the DCT operation performed by the DCT circuit 11. In this manner, playback block data is produced.

Output data of the IDCT circuit 21 are supplied to a data correction circuit 31 and the filtering circuit 33. The data correction circuit 31, which comes into operation during normal playback, corrects errors not corrected by the error correction by interpolation using temporally previous data. Outputs of the data correction circuit 31 are supplied to a fixed terminal a of a changeover switch 32. Outputs of the filtering circuit 33 are supplied to another fixed terminal b of the changeover switch 32. The changeover switch 32 has its movable contact changed over to the fixed terminal a and to the fixed terminal b during normal playback and differential speed playback, respectively. In the present embodiment, video data reproduced and decoded for the differential speed playback mode are passed through the filtering circuit 33 by changing over the change-over switch 32 to the side of the fixed terminal b. The filtering circuit 33 includes a filter for reducing frequency components generated by the repeated occurrences of the blocks in the horizontal and vertical directions, as mentioned hereinabove. Meanwhile, since only error-free data are fetched by the filtering circuit during shuffle playback, it is unnecessary to perform an operation similar to that performed by the data correction circuit 31 in the filtering circuit 33. Output data of the changeover switch 32 is outputted via terminal 20.

Specifically, the filtering circuit 33 includes comb filters.

Figure 3:
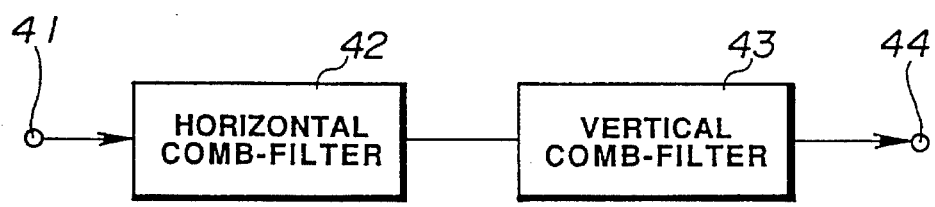
FIG. 3 is a block circuit diagram showing a first concrete example of a filtering circuit of the recording and/or reproducing apparatus according to the present invention.

That is, the filtering circuit 33 includes, in a first concrete example, shown in FIG. 3, a horizontal comb filter 42 and a vertical comb filter 43, capable of reducing the horizontal and vertical frequency components produced by repeated occurrences of the above-mentioned blocks, respectively.

In FIG. 3, video data reproduced and decoded for the differential speed playback mode is supplied block by block via terminal 41 so as to be supplied to the horizontal comb filter 42. Outputs of the horizontal comb filter 42 are transmitted through vertical comb filter 44 so as to be outputted at terminal 44.

The horizontal comb filter 42 for reducing horizontal frequency components of the block including eight horizontal samples has frequency characteristics shown in formula (1):

$$y_i = (1/4)x_{i-8} + (1/2)x_i + (1/4)x_{i+8} \tag{1}$$

whereas the vertical comb filter 43 for reducing vertical frequency components of the block has frequency characteristics shown in formula (2):

$$y_j=(¼)x_{j-4}+(½)x_j+(¼)x_{j+4} \qquad (2)$$

Figure 4:
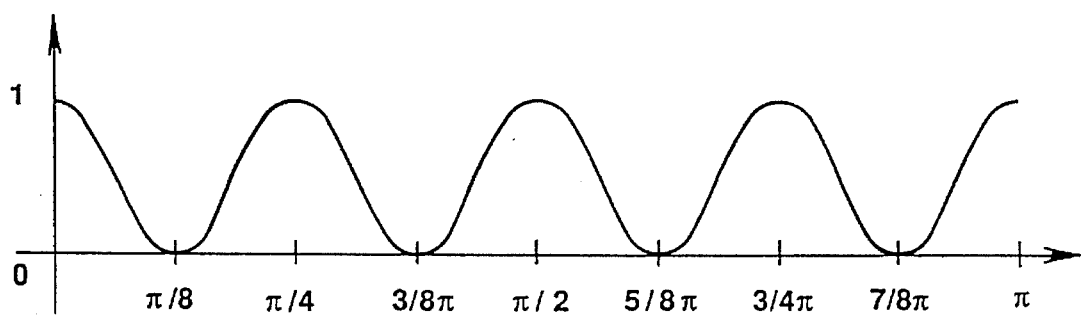
FIG. 4 is a graph for illustrating the frequency characteristics of a comb filter of the filtering circuit shown in FIG. 3.

That is, the horizontal and vertical comb filters 42, 43 have frequency characteristics shown for example in FIG. 4.

Figure 5:
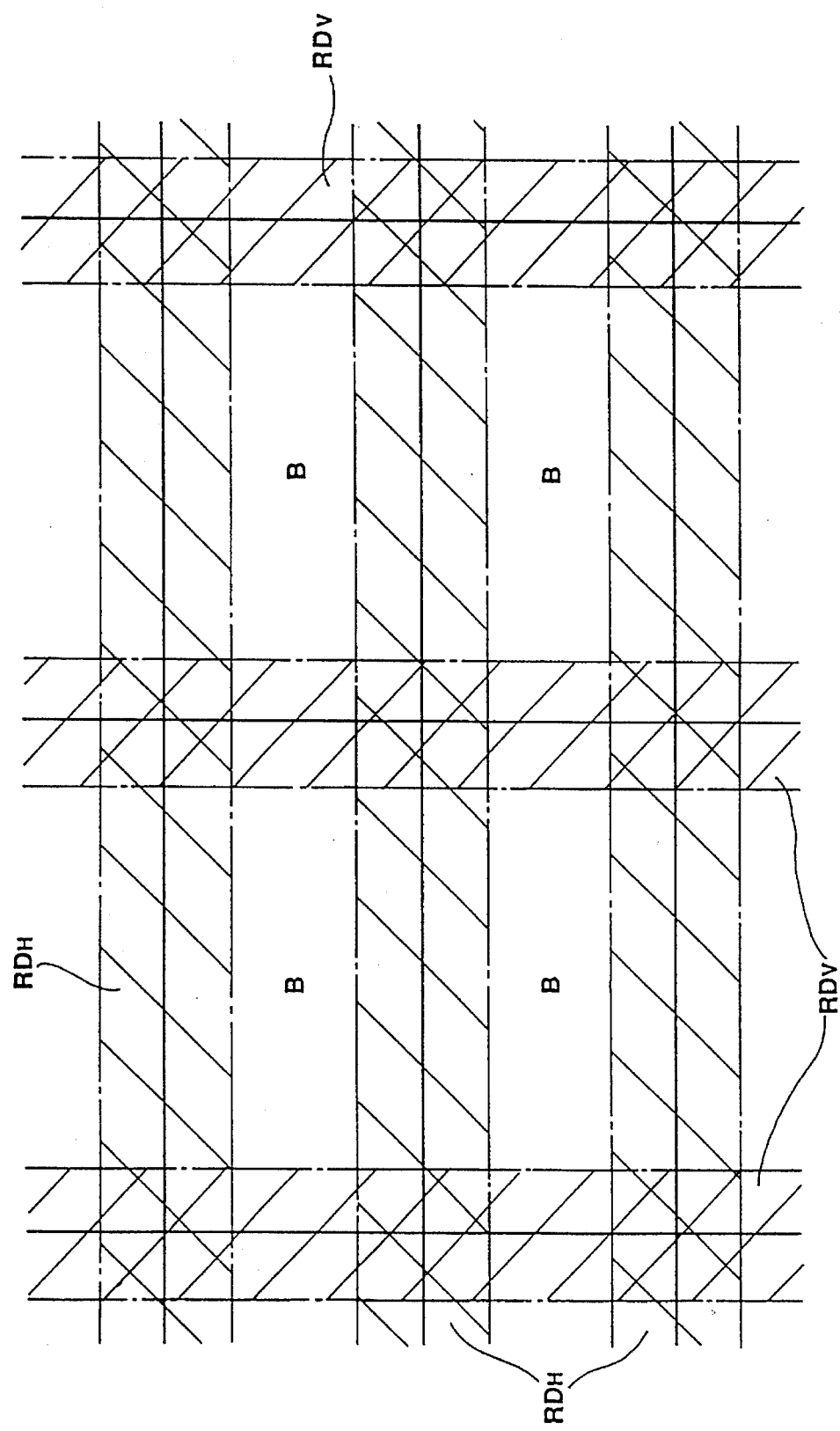
FIG. 5 is a schematic view for illustrating a filtering range and an image in case of employing a comb filter having the frequency characteristics shown in FIG. 4 in the filtering circuit.

By transmitting the block-by-block video data via terminal 41 through horizontal and vertical comb filters 42, 43, the frequency components produced in the horizontal and vertical directions of each block may be reduced, so that a playback image may be produced in which block components shown at $RD_H$ and $RD_V$ in each block B n FIG. 5 may be rendered less outstanding for the differential speed playback mode.

Figure 6:
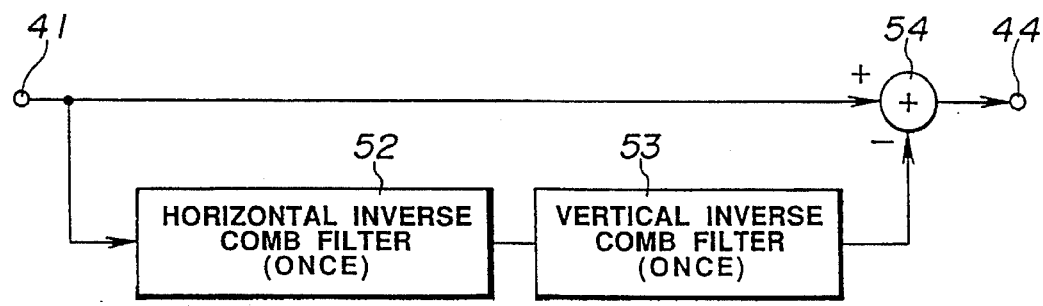
FIG. 6 is a block circuit diagram showing a second concrete example of a filtering circuit of the recording and/or reproducing apparatus according to the present invention.

The second embodiment of the filtering circuit 33, shown in FIG. 6, is provided with filters for reducing frequency components other than the horizontal and vertical frequency components produced by repeated occurrences of the blocks, that is comb filters having characteristics opposite to those shown in FIG. 4, (a horizontal inverse comb filter 52 and a vertical inverse comb filter 53). In such case, the video data reproduced and decoded for the differential playback mode are passed once through these horizontal and vertical inverse comb filters 52, 53 and the resulting filtered outputs, that is the outputs of the vertical inverse comb filter 53, are subtracted from the video data reproduced and decoded for the differential speed playback mode.

In FIG. 6, the reproduced and decoded block-by-block video data, supplied to terminal 41, are passed once through the horizontal inverse comb filter 52 and the vertical inverse comb filter 53 and the resulting filtered output is supplied to an additive node 54 to which the block-by-block video data from terminal 41 is supplied as an additive signal. Outputs of the additive node 54 are outputted at terminal 44.

The horizontal inverse comb filter 52 has frequency characteristics shown in formula (1):

$$y_i=(¼)x_{i-8}+(½)x_i-(¼)x_{i+8} \qquad (3)$$

whereas the vertical inverse comb filter 43 has frequency characteristics shown in formula (2):

$$y_j=-(¼)x_{j-4}+(½)x_j-(¼)x_{j+4} \qquad (4)$$

Figure 7:
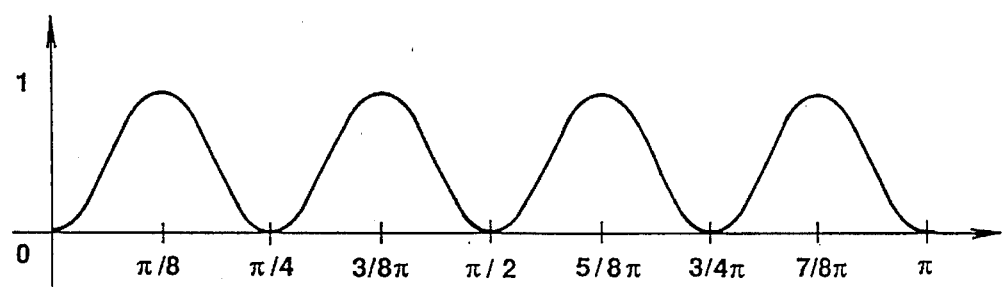
FIG. 7 is a graph for illustrating the frequency characteristics of a comb filter of the filtering circuit shown in FIG. 6.
Figure 8:
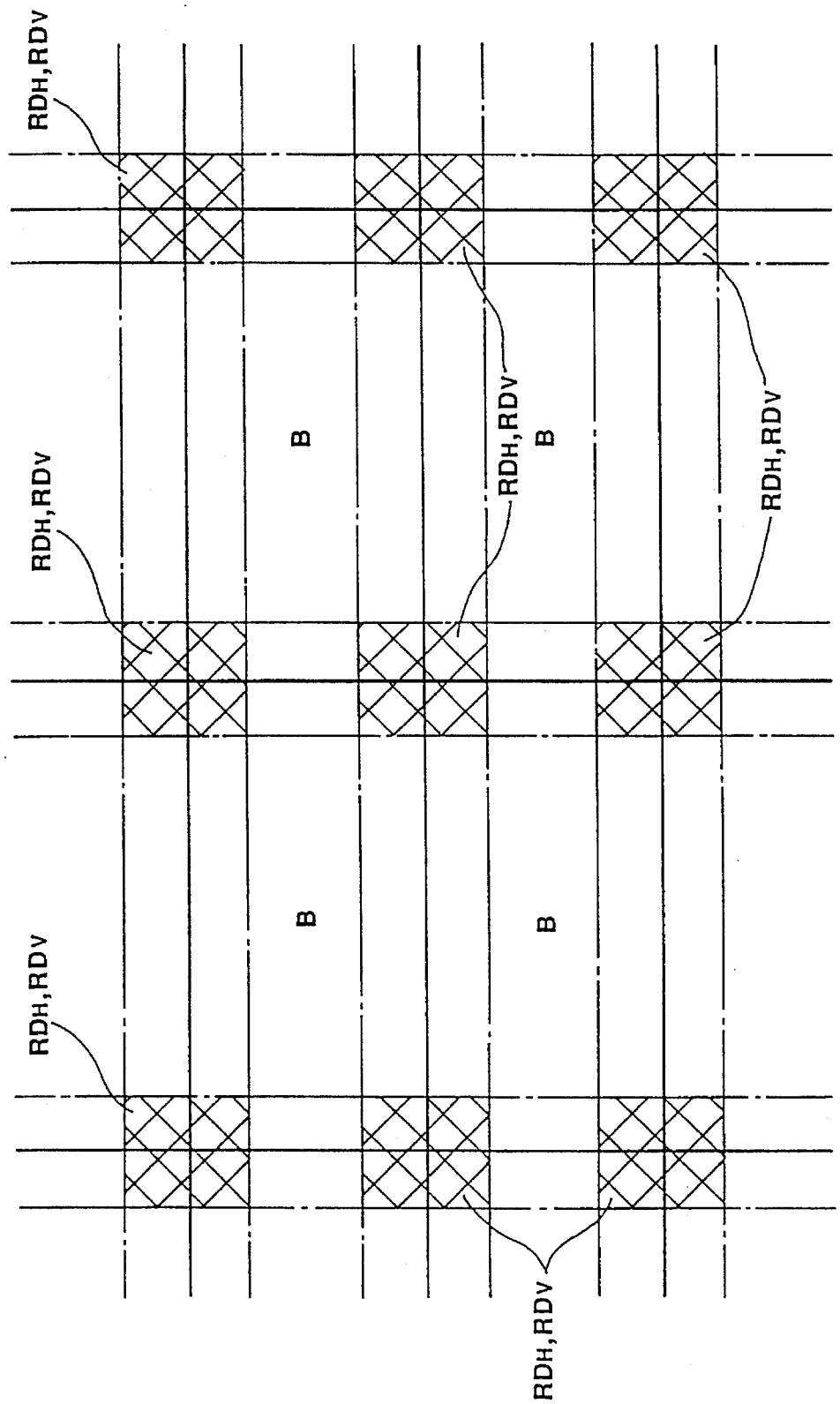
FIG. 8 is. a schematic view for illustrating a filtering range and an image in case of employing a comb filter having the frequency characteristics shown in FIG. 7 in the filtering circuit shown in FIG. 6.

The frequency characteristics of the inverse comb filters 52, 53 are as shown for example in FIG. 7.

By passing the block-by-block video data via terminal 41 once through the horizontal inverse comb filter 52 and through the horizontal inverse comb filter 52, and by subtracting the filtered output from the block-by-block video data, the frequency components of the block portions superposed in the horizontal and vertical directions may be diminished, so that a playback image may be produced in which block components of the portions of the blocks B contained in regions indicated as $RD_H$ and $RD_V$ become less apparent even for the differential playback mode.

Meanwhile, the frequency characteristics of the horizontal comb filter 42, vertical comb filter 43, horizontal inverse comb filter 52 and the vertical inverse comb filter 53, shown in FIGS. 3 and 6, are changed rather smoothly, as shown in FIGS. 4 and 7. Consequently, there is a risk that, even although the block components for the differential speed playback may be rendered less outstanding, the image of the block itself is also filtered to some extent.

Consequently, a third embodiment of the filtering circuit 33 includes a horizontal inverse comb filter 62 for reducing frequency components other than the horizontal frequency components produced by repeated occurrences of the blocks, that is a filter having characteristics opposite to those of the horizontal comb filter 42, and a vertical inverse comb filter 63 for reducing frequency components other than the vertical frequency components produced by repeated occurrences of the blocks, that is a filter having characteristics opposite to those of the vertical comb filter 42. The video data reproduced and decoded for the differential playback mode are passed twice or more through one of the filters 62, 63, herein the filter 62, and are subtracted from the video data at an additive node 64. The resulting subtraction data are passed twice or more through the other filter, herein the filter 63, and the resulting subtraction data are subtracted from the video data passed only through filter 62.

Figure 9:
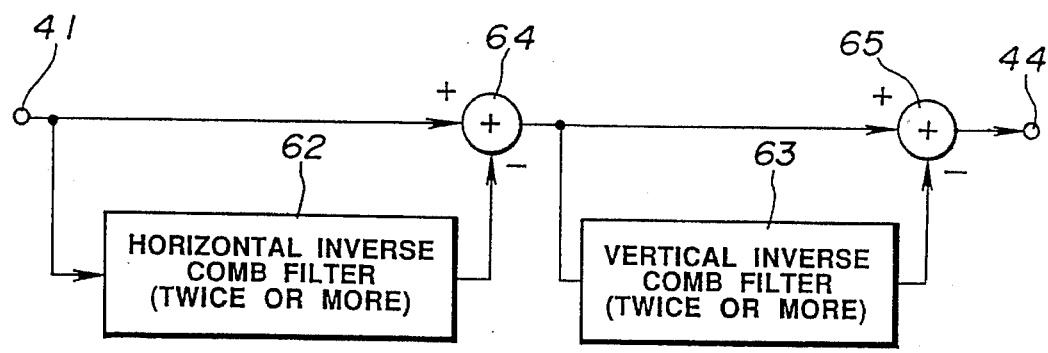
FIG. 9 is a block circuit diagram showing a third concrete example of a filtering circuit of the recording and/or reproducing apparatus according to the present invention.

In FIG. 9, the block-by-block video data, reproduced and decoded for the differential playback mode, are supplied to terminal 41, and passed through the horizontal inverse comb filter 62 at least twice. The resulting filtered output is supplied as a subtractive signal to the subtractive node 64, to which the block-by-block video data is supplied from terminal 41 as an additive signal. An output of the additive node 64 is filtered at least twice through the vertical inverse comb filter 63 and the resulting filtered output is supplied as a subtractive signal to a second additive node 65 to which the subtraction signal from the additive node 64 is supplied as an additive signal. An output of the additive node 65 is outputted at terminal 44.

Figure 10:
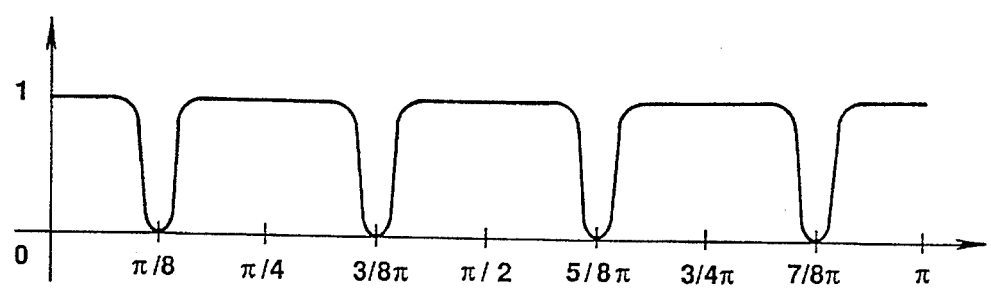
FIG. 10 is a graph for illustrating the frequency characteristics of a comb filter of the filtering circuit shown in FIG. 9.

The horizontal inverse comb filter 62 and the vertical inverse comb filter 63 have frequency characteristics shown in FIG. 7 and by formulas (3) and (4), respectively. However, since the filtering operation by each of these filters 62 and 63 is carried out at least twice in the present third embodiment, the frequency characteristics of the filters 62, 63 are as shown in FIG. 10.

Figure 11:
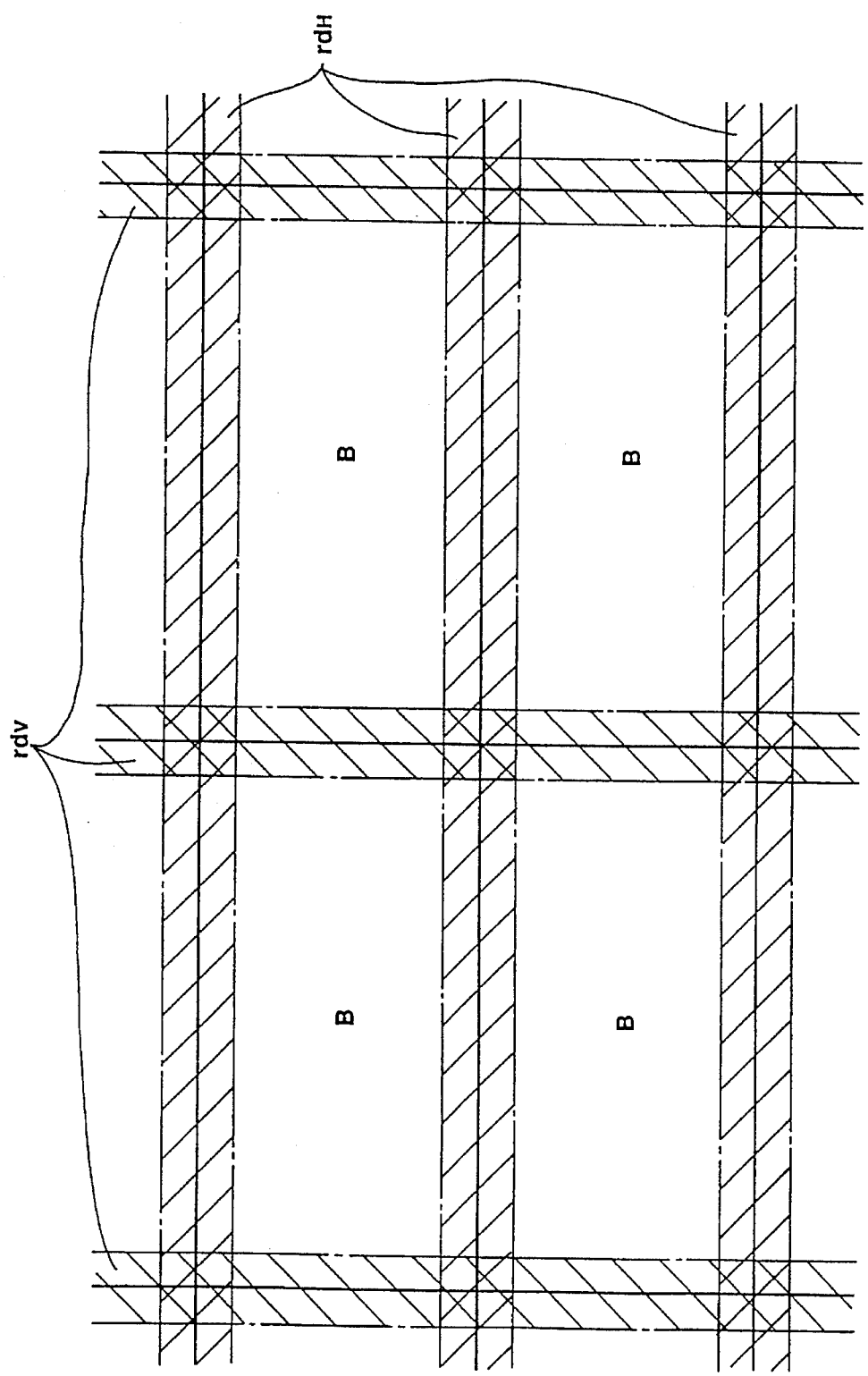
FIG. 11 is a schematic view for illustrating a filtering range and an image in case of employing a comb filter having the frequency characteristics shown in FIG. 10 in the filtering circuit shown in FIG. 9.

That is, in the present third embodiment, the block-by-block video data via terminal 41 are passed at least twice through the horizontal inverse comb filter 62 shown in FIG. 9 so as to be then subtracted by the additive node 64 from the block-by-block video data. The output from the subtractive node 64 is passed at least twice through the vertical inverse comb filter 63 so as to be subtracted at the additive node 65 from the output of the additive node 64 for sharply diminishing the frequency components of the respective blocks. Consequently, a playback image is produced in which block components of the portions of the blocks B indicated as $rd_H$, $rd_V$ shown in FIG. 11 are rendered less apparent, while the image filtering are minimized, even for the differential playback mode.

Figure 12:
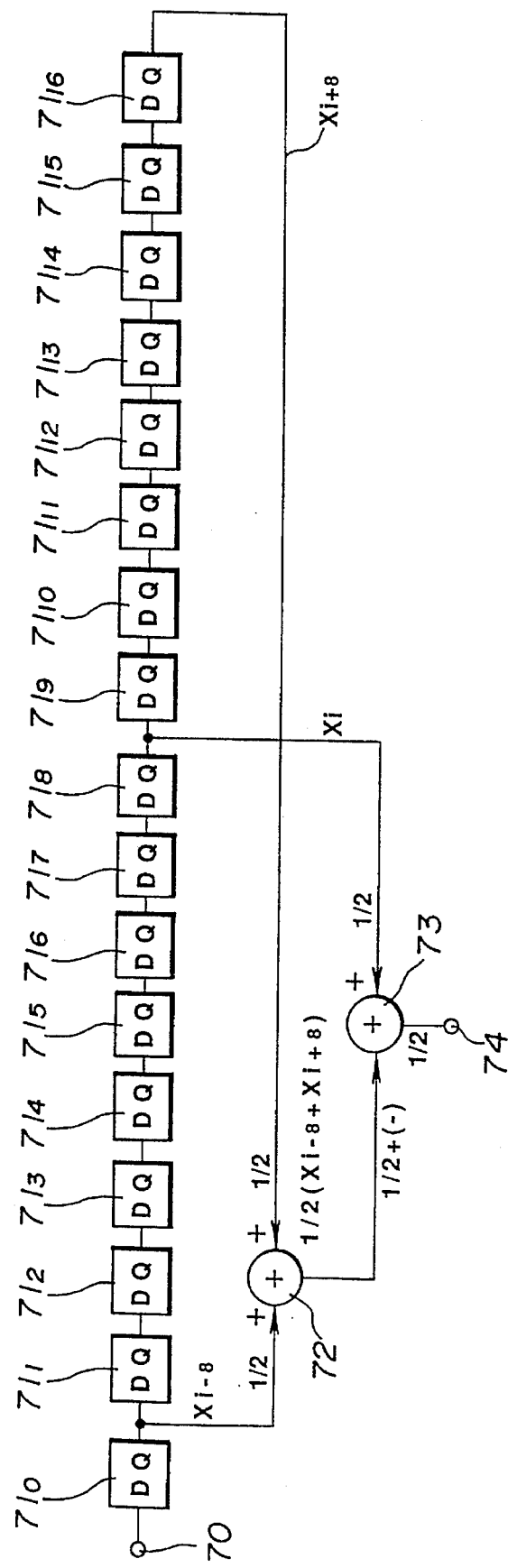
FIG. 12 is a circuit diagram showing a concrete arrangement of a horizontal comb filter and a horizontal inverse comb filter.

The horizontal comb filter 42 and the horizontal inverse comb filters 52, 62 may be implemented by an arrangement shown for example in FIG. 12.

In FIG. 12, block-by-block input data, supplied to terminal 70, are sequentially supplied to flip-flops $71_0$ to $71_{16}$. Outputs of flip-flops $71_0$ and $71_{18}$ are halved, that is multiplied by ½, so as to be summed at an additive node 72. An output of the additive node 72 and an output of flip-flop $71_8$ are also halved and transmitted to an additive node 73. However, for the horizontal comb filter 42, the output of the additive circuit 72 and the output of the flip-flop $71_8$ are supplied as additive signals to the additive node 73, whereas, for the horizontal inverse comb filters 52, 62, the output of flip-flop $71_8$ and the output of the additive node 72 are supplied as an additive signal and as a subtractive signal to the additive node 73, respectively. On the other hand, for the horizontal inverse comb filter 62, an output of the additive node 73 is outputted at an output terminal 74 and re-transmitted to another terminal similar to terminal 70 shown in FIG. 12 for achieving the filtering at least twice.

Figure 13:
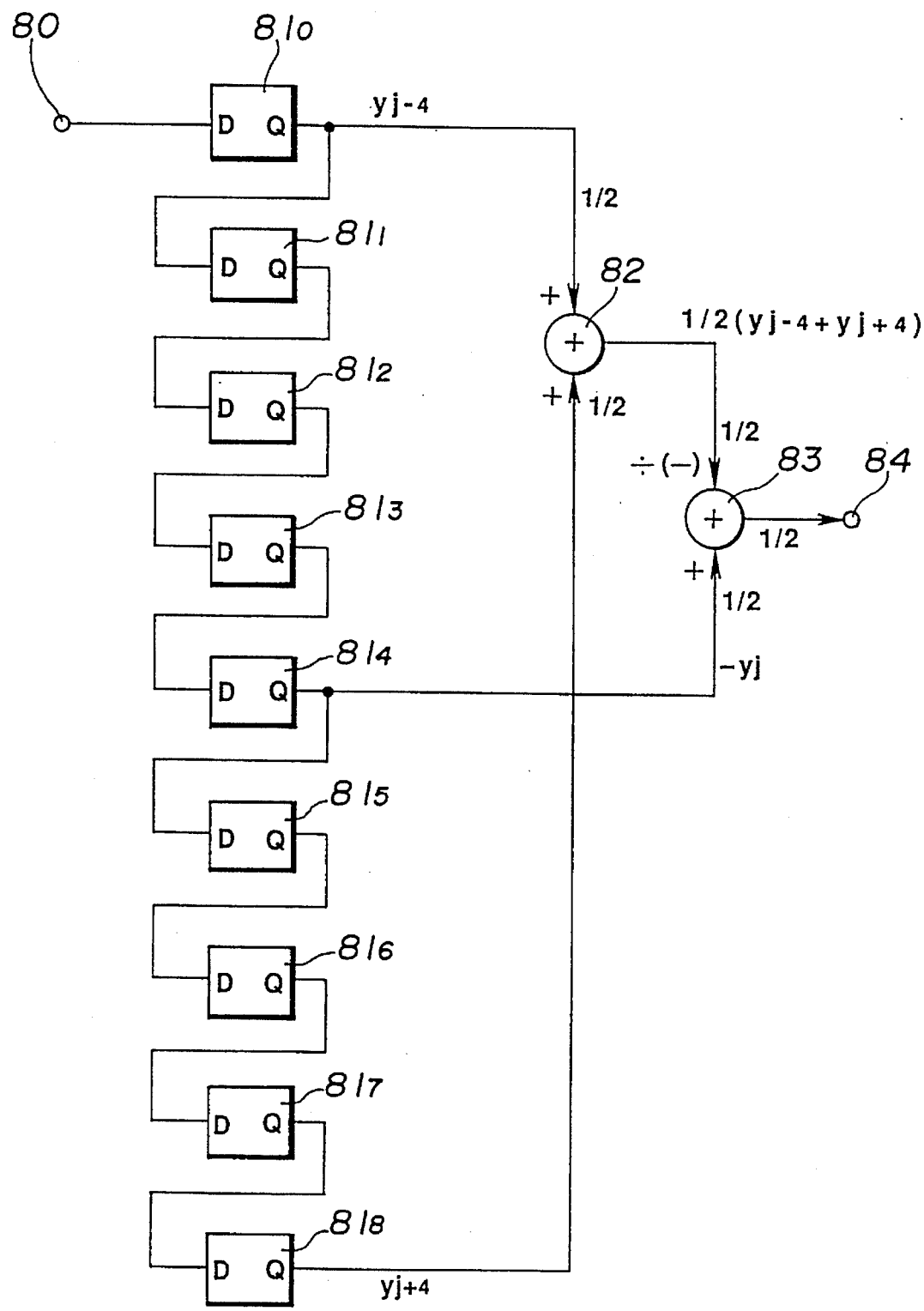
FIG. 13 is a circuit diagram showing a concrete arrangement of the horizontal comb filter and the horizontal inverse comb filter.

On the other hand, the vertical comb filer 43 and the vertical inverse comb filters 53, 63 may be implemented by an arrangement as shown for example in FIG. 13.

In FIG. 13, block-by-block input data, supplied to terminal 80, are sequentially supplied to flip-flops $81_0$ to $81_8$. Outputs of flip-flops $81_0$ and $81_8$ are halved, that is multiplied by ½, and summed at an additive node 82. An output of the additive node 82 and an output of flip-flop $81_4$ are also halved and transmitted to an additive node 83. However, for the vertical comb filter 43, the output of the additive circuit 82 and the output of the flip-flop $81_4$ are supplied as additive signals to the additive node 83, whereas, for the vertical inverse comb filters 53, 63, the output of flip-flop $81_4$ and the output of the additive node 82 are supplied as an additive signal and as a subtractive signal to the additive node 83, respectively. On the other hand, for the vertical inverse comb filter 63, an output of the additive node 83 is outputted at an output terminal 84 and re-transmitted to another terminal similar to terminal 80 shown in FIG. 12 for achieving the filtering at least twice.

With the above-described recording and/or reproducing apparatus, the block structure is rendered less outstanding even during the differential speed playback, such as during shuttle playback, for improving the picture quality.

Meanwhile, it may be contemplated to pass the block data through a low-pass filter in order to render the block structure less perceptible. However, if the block data are simply passed through a low-pass filter, the image is filtered in its entirety to detract from picture quality. If however the block data are separated into even-numbered and odd-numbered samples for encoding and decoding, the deterioration in the picture quality may be compensated by passing the block data through a low-pass filter.

It is noted that the block structure is not limited to a block consisting of four horizontal lines each of eight vertical samples. It is noted that the comb filters employed in this case should be of a size corresponding to the size of the block.

Besides, the filter employed in the filtering circuit 33 may be designed as comb filter for reducing only the fundamental frequency of the block or a part of harmonics, such as odd harmonics, instead of reducing the fundamental frequency and all of the harmonics.

Although all of the data may be processed with the comb filters and the reverse comb filters, it is also possible to process the data with the filters only when it is decided that the video data to be reproduced has a block structure, that is, contains block frequency components.

The filtering circuit 33 may also be designed to output a data, which is the video data reproduced and decoded for the differential speed playback mode and which is passed through the comb filters, in admixture with data which is the video data transmitted without being passed through the comb filters.

Meanwhile, when employing the comb filters for reducing the block frequency components as described above, there is a risk that not only the frequency components of the blocks but also delicate components of the playback image are lost.

Figure 14:
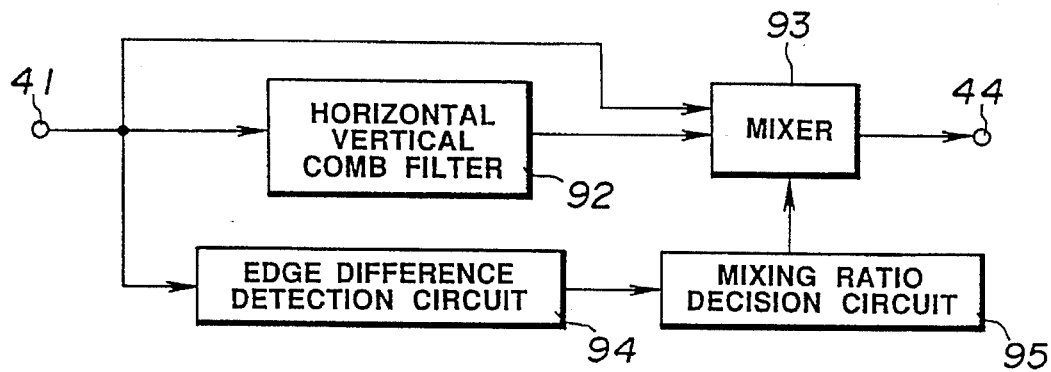
FIG. 14 is a block circuit diagram showing a fourth concrete example of a filtering circuit of the recording and/or reproducing apparatus according to the present invention.

In this consideration, the fourth embodiment of the filtering circuit 33 shown in FIG. 14 includes, besides horizontal and vertical comb filter 92 for reducing the horizontal and vertical frequency components produced by repetitive occurrences of the blocks of samples, an edge difference detection circuit 94 for finding the sum of differences between neighboring samples of sample blocks neighboring to each other edge by edge for detecting the possible presence of horizontal and vertical block components produced by repetitive occurrences of the blocks of samples, a mixing ratio decision circuit 95 for deciding a mixing ratio of data passed through the horizontal and vertical comb filter 92 and data not passed through the comb filter 92, using the sum of the differences found by the edge detection circuit 94, and a mixing circuit 93 for mixing the data passed through the horizontal and vertical comb filter 92 and data not passed through the comb filter 92 based on the mixing ratio as decided by the decision circuit 95 and outputting the resulting mixed signal as video signals.

In FIG. 14, the block-by-block video data reproduced and decoded for the differential speed playback mode are supplied to a terminal 41. The block-by-block video data are entered on one hand to a mixing circuit 93 after being passed through the horizontal and vertical comb filter 92, while being entered on the other hand without being passed through the horizontal and vertical comb filter 92. The horizontal and vertical comb filter 92 may be any one of the comb filters described in connection with FIGS. 3, 6 and 9.

Figure 15:
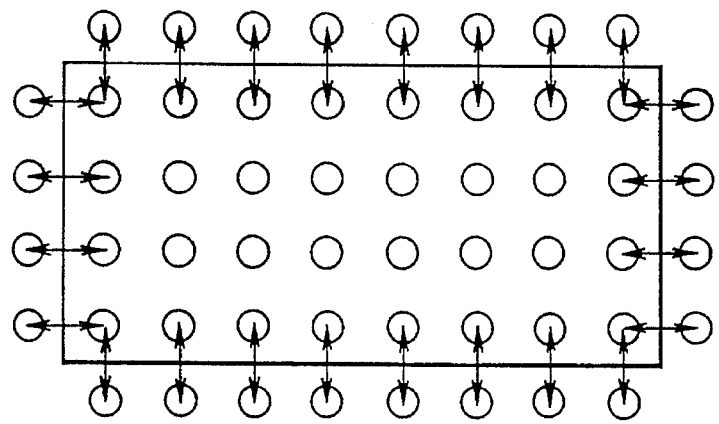
FIG. 15 is a diagrammatic view for illustrating block edge difference detection in the filtering circuit shown in FIG. 14.
Figure 16:
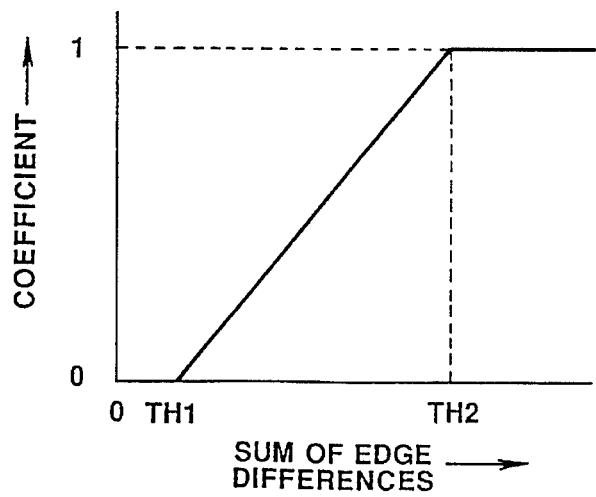
FIG. 16 is a graph for showing the relation between the sum and the coefficient of edge differences in the filtering circuit shown in FIG. 14.

Besides, the video data reproduced and decoded for the differential playback mode is entered to the edge difference detection circuit 94 to find a sum of the differences between neighboring samples of the blocks neighboring to each other edge to edge. In FIG. 15, samples indicated by O make up a block consisting of four vertical lines each consisting of eight horizontal samples, and differences are to be found of the samples lying at the block boundaries, that is the samples adjacent to each other with the edges of the adjoining blocks therebetween. Arrows in the drawing indicate block edge samples for which the differences are to be found. The sum of these differences is found from one block to another.

The sum of the edge differences is supplied to the mixing ratio decision circuit 95 for deciding the mixing ratio between data passed through the horizontal and vertical comb filter 92 and data not passed through the comb filter 92. The mixing ratio may be decided in a number of ways. For example, a coefficient is set to 0 or 1 if the sum of the edge differences is smaller than a threshold TH1 and larger than another threshold TH2, respectively, and the mixing ratio is decided based on the coefficient. On the other hand, the coefficient is decided so as to be proportional to the sum of the edge differences if the sum value is intermediate between the thresholds TH1 and THE.

Video signals are outputted from the mixing circuit 93 based on the thus decided mixing ratio. If the coefficient is 0, only video data which has not been passed through the horizontal and vertical comb filter 92 is outputted as video signals, whereas, if the coefficient is 1, only the video data passed through the filter 92 is outputted as video signals. If the coefficient is intermediate between 0 and 1, video signals are outputted which are a mixture of the video data from the filter 92 and the video data not passed through the filter 92 depending on the coefficient value.

Figure 17:
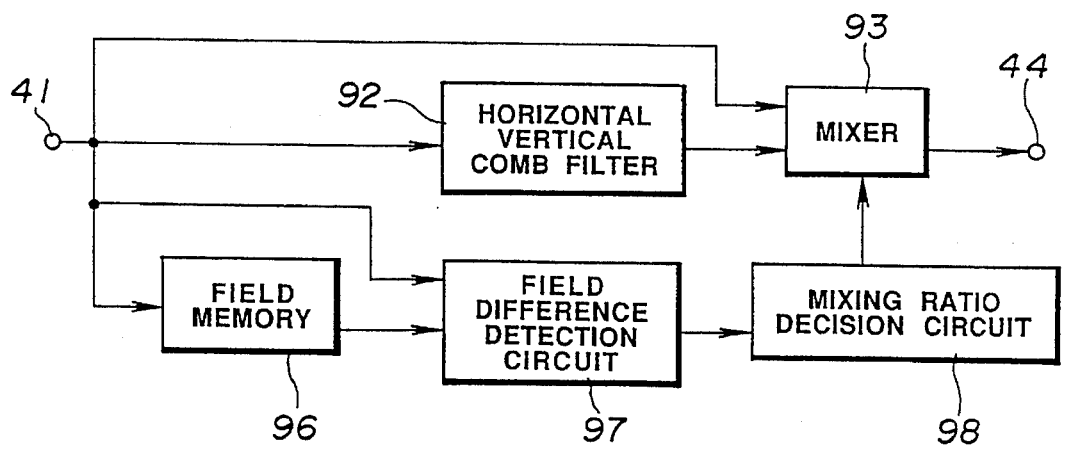
FIG. 17 is a block circuit diagram showing a fifth concrete example of a filtering circuit of the recording and/or reproducing apparatus according to the present invention.
Figure 18:
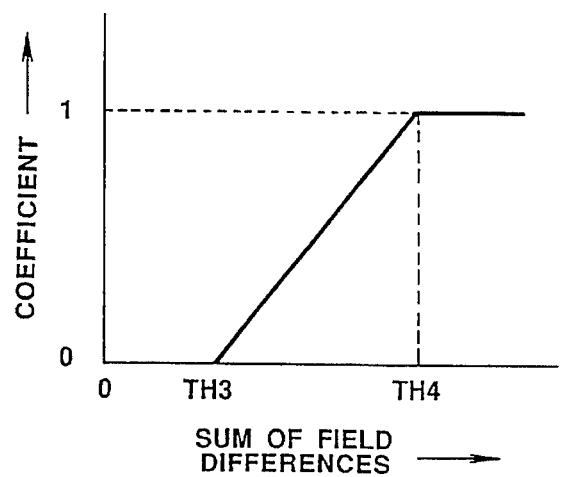
FIG. 18 is a graph for showing the relation between the sum and the coefficient of edge differences in the filtering circuit shown in FIG. 17.

The filtering circuit 33 according to the fifth embodiment shown in FIG. 17 includes, instead of the edge difference detection circuit 94, a field memory 96 for delaying the video data reproduced and decoded for the differential speed playback mode, and a field difference detection circuit 97 for finding the sum of differences of field components of video data blocks from the field memory 96.

In FIG. 17, block-by-block video data reproduced and decoded for the differential speed playback mode are supplied via terminal 41. The block-by-block video data are supplied on one hand via the horizontal and vertical comb filter 92 to the mixing circuit 92, while being supplied on the other hand without being passed through the horizontal and vertical comb filter 92. The horizontal and vertical comb filter 92 may be any of the comb filters explained in connection with FIGS. 3, 6 and 9.

Besides, the video data are also supplied to the field memory 96 and to the field difference detection circuit 97. The field memory 96 delays the video data by one field to transmit the delayed video data to the field difference detection circuit 97. The field difference detection circuit 97 finds a difference between each sample in the block and the corresponding sample of the delayed video data, that is the sample of a directly previous field, while finding the sum of the differences from block to block. The purpose of the above-described operation is to detect if the samples in the block remain stationary, that is if the image is stationary, for preventing the video data from being passed through the horizontal and vertical comb filter 92 if the block is in the stationary region of the image even although frequency components close to the block frequency is contained in the video data.

The sum of the field differences is transmitted to the mixing ratio decision circuit 95 for deciding the mixing ratio between data passed through the horizontal and vertical comb filter 92 and data not passed through the horizontal and vertical comb filter 92. The mixing ratio may be decided in a number of ways. For example, a coefficient is set to 0 or 1 if the sum of the edge differences is smaller than a threshold TH3 and larger than another threshold TH4, respectively, and the mixing ratio is decided based on the coefficient value. On the other hand, the coefficient is decided so as to be proportional to the sum of the edge differences if the sum value is intermediate between the thresholds TH3 and TH4.

Video signals are outputted from the mixing circuit 93 based on the thus decided mixing ratio. If the coefficient is 0, only video data which has not been passed through the horizontal and vertical comb filter 92 is outputted as video signals, whereas, if the coefficient is 1, only the video data passed through the filter 92 is outputted as video signals. If the coefficient is intermediate between 0 and 1, video signals are outputted which are a mixture of the video data from the filter 92 and the video data not passed through the filter 92 depending on the coefficient value.

Figure 19:
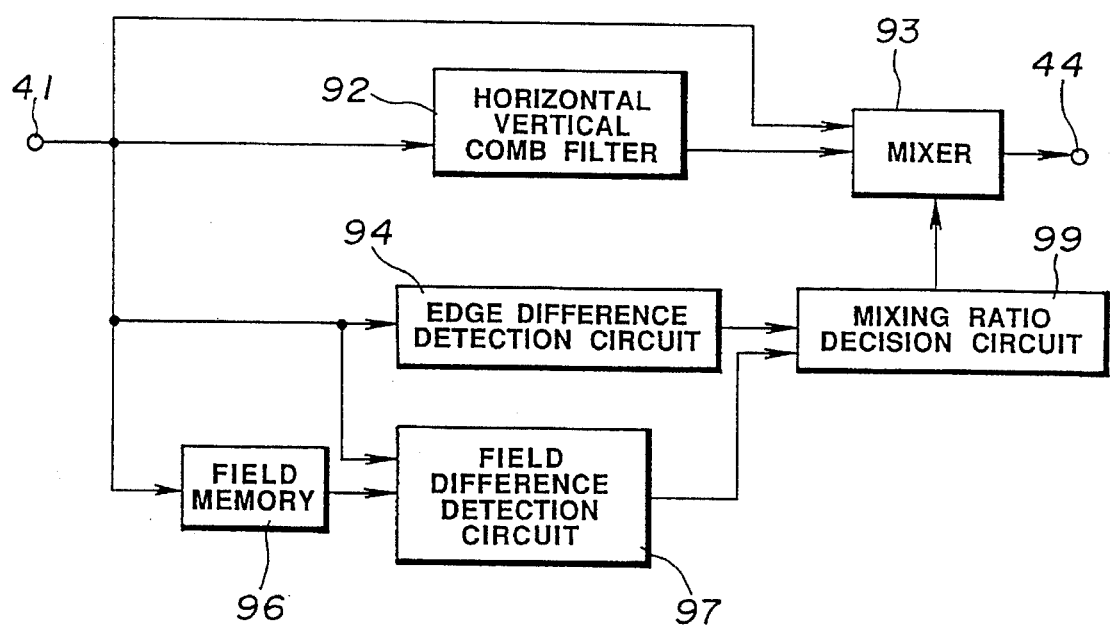
FIG. 19 is a block circuit diagram showing a sixth concrete example of a filtering circuit of the recording and/or reproducing apparatus according to the present invention.

The filtering circuit 33 according to the sixth embodiment shown in FIG. 19 includes, besides the horizontal and vertical comb filter 92 for reducing horizontal and vertical frequency components produced by repeated occurrences of the blocks of samples by passing the video data reproduced and decoded for the differential speed playback mode through the filtering circuit 33, the above-mentioned edge detection circuit 94 for finding the sum of differences of block edge samples of the video data, a field memory 96 for delaying the video data by one field, a field difference detection circuit 97 for finding the sum of the field differences of the video data blocks from the field memory 96, a mixing ratio decision circuit 99 for deciding the mixing ratio between the data passed through the horizontal and vertical comb filter 92 and the data not passed through the horizontal and vertical comb filter 92, and the mixing circuit 93 for outputting video signals based on the thus decided mixing ratio.

Although a mean value of the coefficient derived from the sum of the edge differences and the coefficient derived from the sum of the field differences is found in the mixing ratio decision circuit 99 for deciding the mixing ratio, a mean value may be calculated by suitably weighting one of the coefficients or by multiplying the two coefficients.

In deciding the coefficient based on the sum of the edge differences, it is also possible to decide the ratio of data passed through the horizontal comb filter and that of data passed through the vertical comb filter based on the horizontal and vertical edge differences, respectively.

By detecting the possible presence of the block components in the playback image for the differential speed playback such as shuttle playback, and changing the proportions of the video data passed through the horizontal and vertical comb filter 92 based on the detected results, the block components may be canceled without loss in the delicate components in the playback image.

Figure 20:
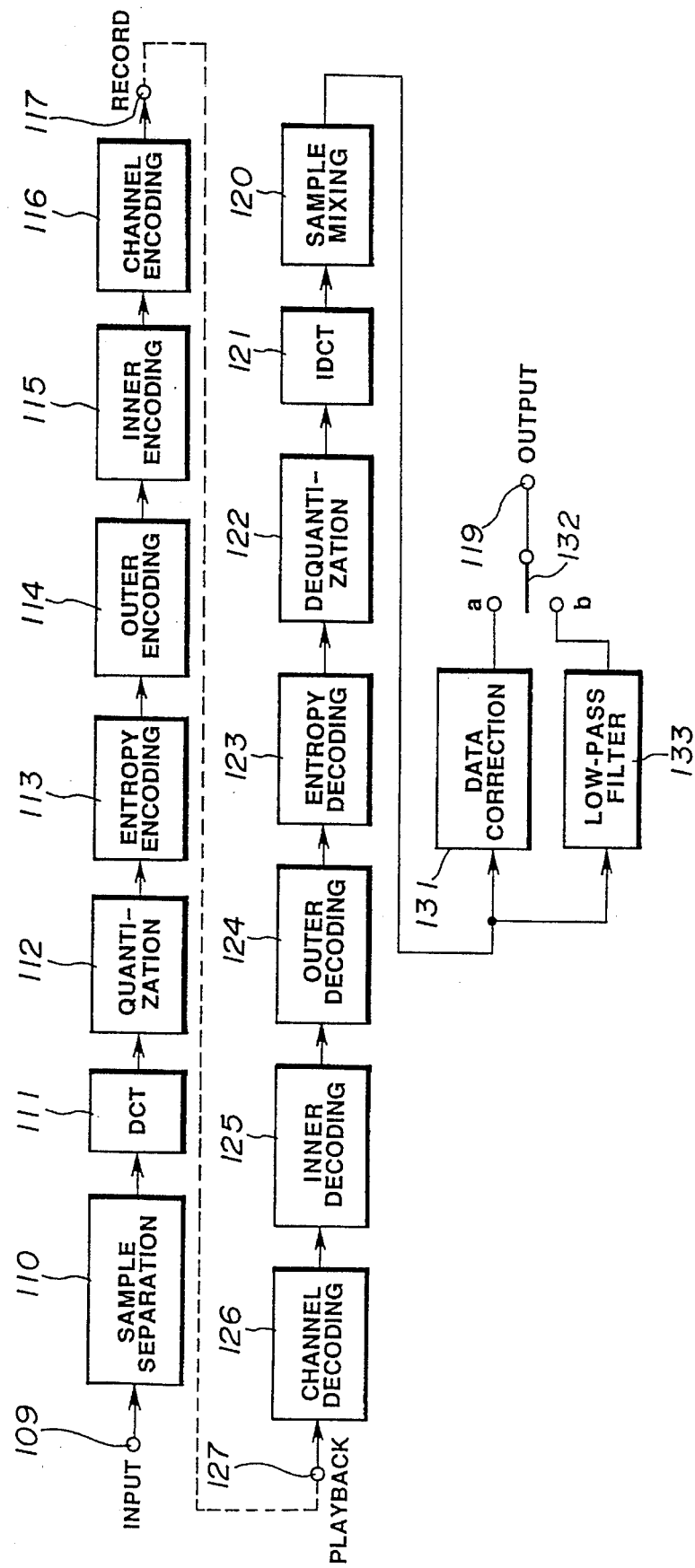
FIG. 20 is a schematic block circuit diagram showing an arrangement of a second embodiment of a video signal recording and/or reproducing apparatus according to the present invention.
Figure 21:
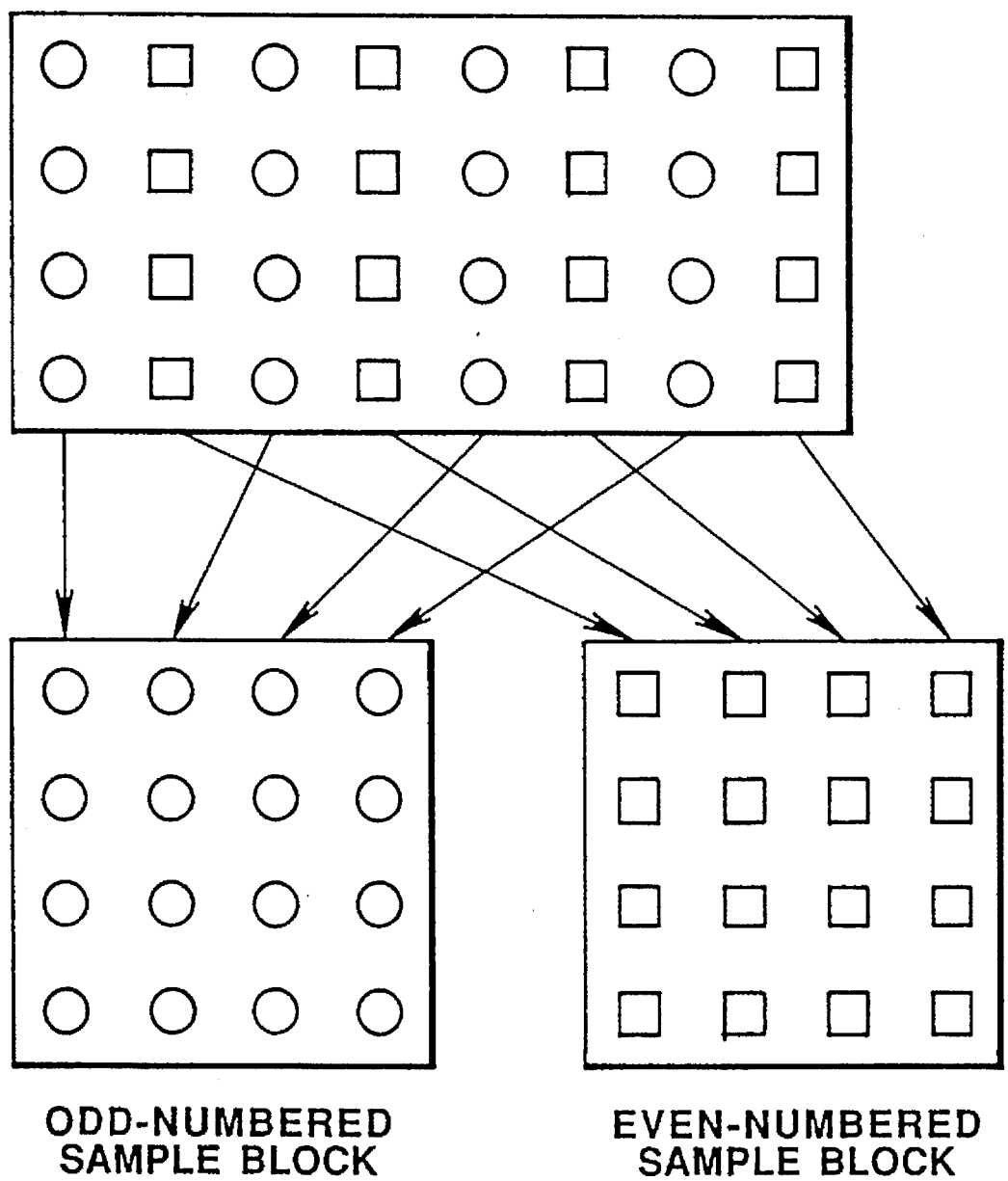
FIG. 21 is a diagrammatic view showing sub-blocks of odd-numbered samples and even-numbered samples in the recording and/or reproducing apparatus according to the present invention.

FIG. 20 shows a schematic arrangement of the recording and/or reproducing apparatus for recording input video data after separation thereof into odd-numbered samples and even-numbered samples. In the present embodiment of the recording and/or reproducing apparatus, each of blocks consisting of four vertical lines each consisting of eight horizontal samples is separated into odd-numbered samples indicated by . . . and even-numbered samples indicated by a square mark and encoding is carried out for each of sub-blocks consisting of the odd-numbered samples and each of sub-blocks consisting of the even-numbered samples. After the encoded data are recorded on a video tape, the video tape is reproduced to produce data consisting of the odd-numbered and even-numbered samples from one sub-block to another. The odd-numbered and even-numbered samples are mixed in a sample mixing circuit 120 for producing output video data based on a reconstituted block consisting of the four vertical lines and eight horizontal samples.

If the differential speed playback such as the above-mentioned shuttle playback is to be performed using the above-mentioned recording and/or reproducing apparatus, sub-block data of the even-numbered samples and sub-block data of the odd-numbered samples are taken independently of each other, so that lattice-shaped blocks due to mixing of the odd-numbered and even-numbered samples become apparent.

Figure 22:
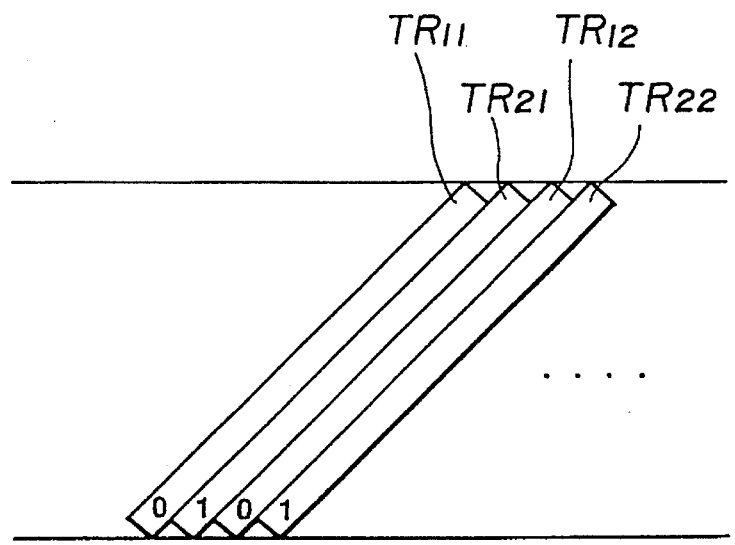
FIG. 22 shows recording tracks in the recording and/reproducing apparatus according to the second embodiment of the present invention.
Figure 23:
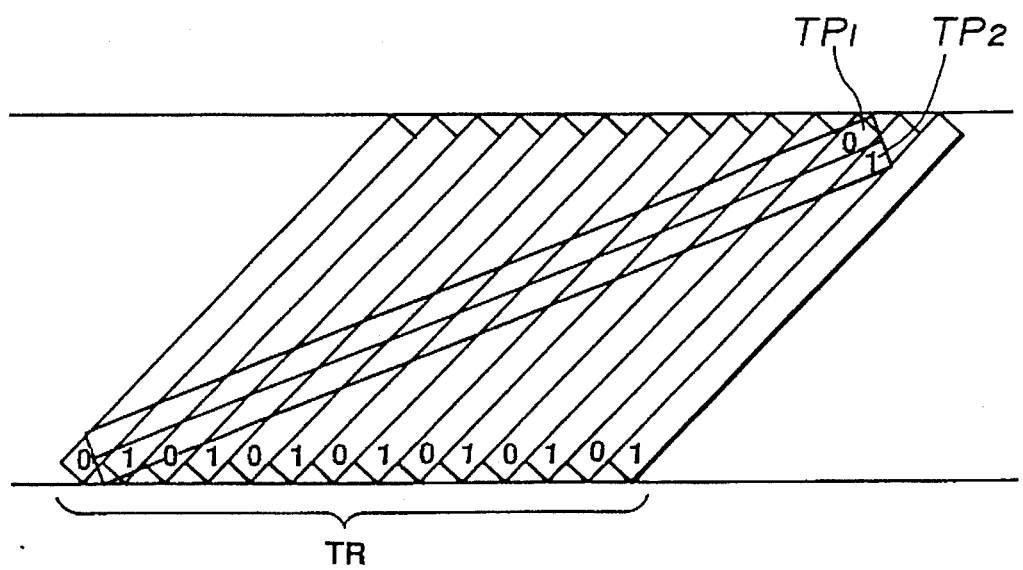
FIG. 23 shows tracing pattern of a playback head scanning recording tracks during differential speed reproduction by the recording and/or reproducing apparatus according to the second embodiment of the present invention.

That is, the odd-numbered samples and the even-numbered samples are alternately recorded on the video tape by the recording and/or reproducing apparatus in such a manner that even-numbered samples and odd-numbered samples are recorded on tracks $TR_{11}$, $TR_{12}$, . . . and on tracks $TR_{21}$, $TR_{22}$, . . . , respectively, as shown in FIG. 22. At this time, a playback head scans across plural tracks TR recorded on the video tape during differential speed reproduction. That is, with video data of the blocks of the odd-numbered and even-numbered samples, video data of different time regions, such as trace patterns $TP_1$, $TP_2$, . . . , are reproduced. Therefore, the playback image obtained by mixing the odd-numbered samples and the even-numbered samples appears as a number of lattice-shaped blocks of the odd-numbered and even-numbered samples.

Consequently, a low-pass filter 133 for reducing the latticed frequency components, produced by mixing the odd-numbered and even-numbered samples is provided in the present embodiment and, during the differential sped playback mode, such as the above-mentioned shuttle playback, the video data reproduced and decoded for the differential speed playback mode is passed through the low-pass filter 133. The signal processing by the components of the recording and/or reproducing apparatus from the DCT circuit 111 up to the IDCT circuit 121, data correction circuit 131 and the changeover switch 132, is similar to that by the components from the DC circuit 11 up to the IDCT circuit 21, data correction circuit 31 and the changeover switch 32, so that the corresponding description is omitted for simplicity.

Meanwhile, the low-pass filter 133 is adapted for reducing the lattice-shaped frequency components generated by mixing the odd-numbered and even-numbered samples, and has a cut-off frequency slightly lower than e.g. the Nyquist frequency.

Figure 24:
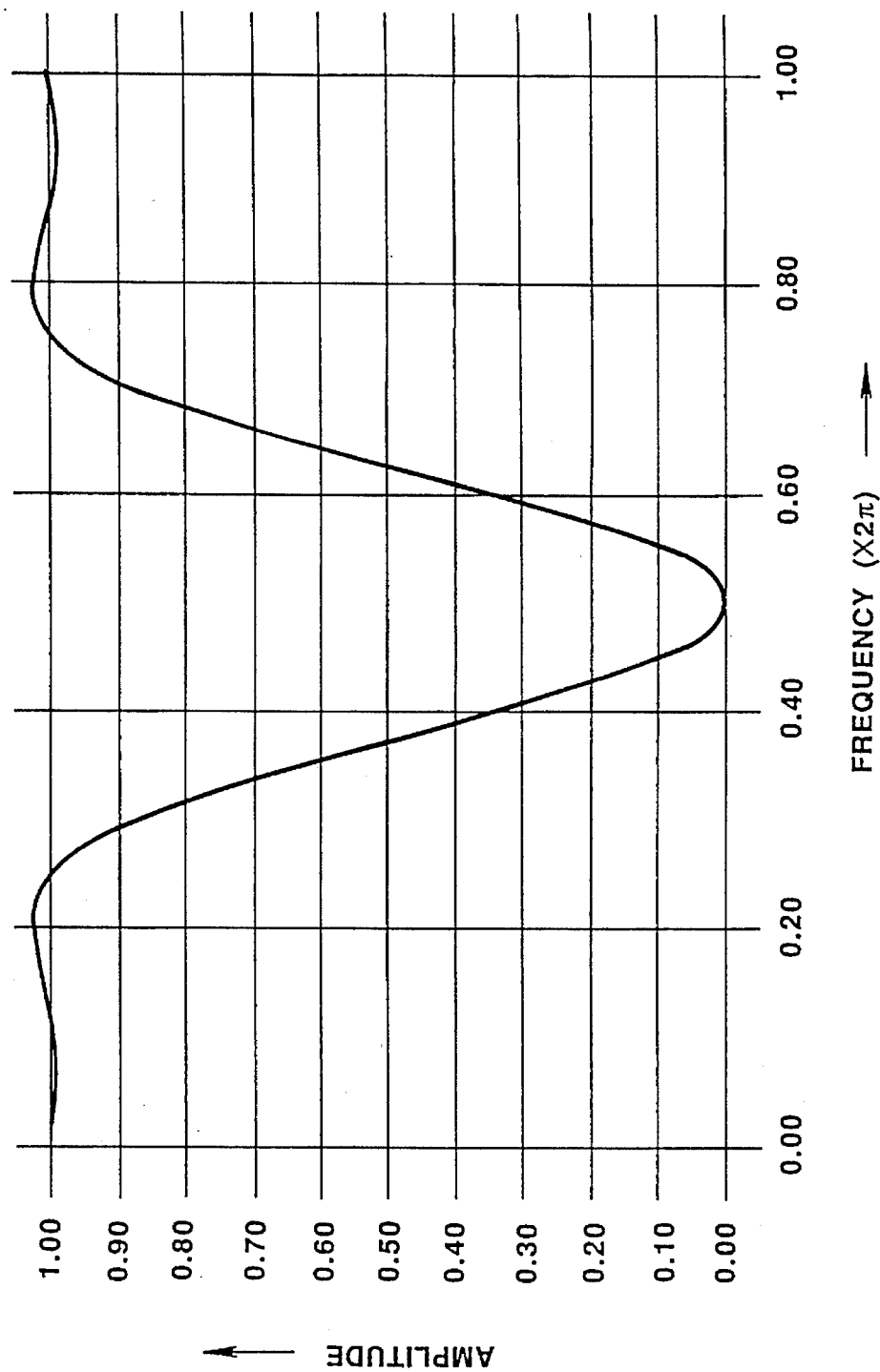
FIG. 24 is a graph showing frequency characteristics of a low-pass filter in the recording and/reproducing apparatus according to the second embodiment of the present invention.

However, if the cut-of frequency is too high, the lattice-shaped frequency components are left over, whereas, if it is too low, delicate components of the playback image are lost. A concrete example of the frequency characteristics of the low-pass filter 133 is shown in FIG. 24. The cut-off frequency is set to $\frac{3}{4}f_1$. By smoothing the odd-numbered and even-numbered samples, taken at different or discrete time regions by the low-pass filter 133 having the frequency characteristics shown in FIG. 24, the effects of filtering along the time scale may be produced, so that the lattice-like block components may be rendered less apparent without excessively losing the delicate components of the playback image.

Figure 25:
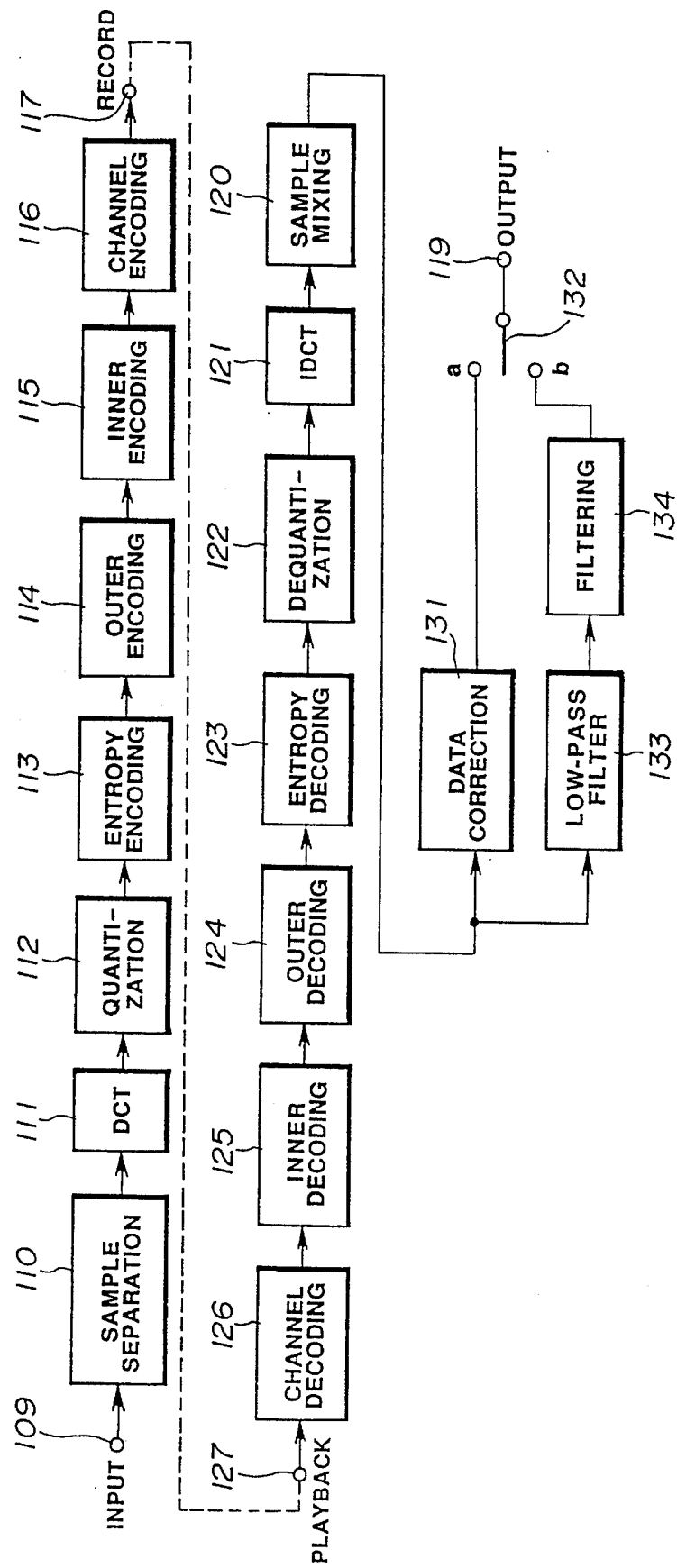
FIG. 25 is a schematic block circuit diagram showing an arrangement of an apparatus for recording and/or reproducing video signals according to the present invention.

It is also contemplated to pass the video data of the odd-numbered and even-numbered sub-blocks through the low-pass filter and thence through the filtering circuit 134 shown in FIG. 25, in which case more delicate and excellent playback image may be produced.

Although the video data grouped into blocks at an interval of a predetermined number of pixels are processed with DCT in the present embodiment, it is also possible to employ a block grouping and encoding other than that described in the foregoing.

The block structure prior to separation into odd-numbered and even-numbered samples in the present embodiment is not limited to the above-described structure consisting of four vertical lines each consisting of eight horizonal samples. For example, a block structure consisting of eight horizontal lines and eight vertical samples or a block structure consisting of four horizontal lines and four vertical samples may be separated in the above-described manner.

With the above-described recording and/or reproducing apparatus of the present invention, high-quality playback images with suppressed block components may be obtained even for a differential playback mode by providing a filter circuit for reducing frequency components produced in the horizontal and vertical directions by repetitive occurrences of the blocks of samples and by passing the video data reproduced for the differential playback mode through this filter means.

Also, by mixing the video data reproduced and decoded for the differential playback mode with data consisting in the decoded video data passed through the filter means and by changing the mixing ratio in dependence upon the block components and the stationary state of the blocks of samples, high-quality playback images with suppressed block components may e produced without loss of the delicate components of the playback images.

In addition, with the recording and/or reproducing apparatus of the present invention in which input video data are recorded and reproduced as even-numbered sample data and odd-numbered sample data, high-quality playback images with suppressed latticed components may be obtained even for the differential speed playback mode by providing a low-pass filter for reducing latticed frequency components produced by mixing sub-blocks consisting of the odd-numbered samples and even-numbered samples and by passing video data reproduced and decoded for the differential speed playback mode through this low-pass filter.

What is claimed is:

1. A recording and/or reproducing apparatus in which input video data are grouped into blocks each consisting of a predetermined number of samples and encoded and recorded on a recording medium on a block-by-block basis, and in which the data of each of said blocks, obtained by reproducing the recording medium, is decoded to produce output video data from which an output video picture is derived, said apparatus being selectively operable in normal or differential speed playback modes, comprising data correcting means for correcting the data of said blocks by interpolation, filter means including comb filter means for diminishing frequency components produced in horizontal and vertical directions by repetitive occurrences of said blocks and thereby reducing a mosaic appearance which otherwise would be present in said output video picture, and means for selectively supplying the reproduced and decoded blocks of video data to said data correcting means while bypassing the filter means in a normal playback mode or to said filter means while bypassing the data correcting means in a differential playback mode.

2. The recording and/or reproducing apparatus as claimed in claim 1 wherein said comb filter means further reduces frequency components other than those generated in the horizontal and vertical directions by repetitive occurrences of said blocks, and includes subtracting means for subtracting an output of said comb filter means from said reproduced and decoded blocks of video data.

3. A recording and/or reproducing apparatus in which input video data are grouped into blocks each consisting of a predetermined number of samples and encoded and recorded on a recording medium on a block-by-block basis, and in which the data of each of said blocks, obtained by reproducing the recording medium, is decoded to produce output video data, said apparatus being selectively operable in normal or differential speed playback modes, comprising data correcting means for correcting the data of said blocks by interpolation, filter means for diminishing frequency components produced in horizontal and vertical directions by repetitive occurrences of said blocks, said filter means including a horizontal comb filter for reducing frequency components other than those generated in the horizontal direction by repetitive occurrences of said blocks and a vertical comb filter for reducing frequency components other than those generated in the vertical direction by repetitive occurrences of said blocks, first subtracting means for subtracting the reproduced and decoded video data which is passed through one of said horizontal and vertical comb filters at least twice from the corresponding reproduced and decoded video data to produce subtracted output data, second subtracting means for subtracting from the subtracted output data subtracted output data which is passed through the other of said horizontal and vertical comb filters at least twice, and means for selectively supplying the reproduced and decoded video data to said data correcting means in a normal playback mode or to said horizontal and vertical comb filters and to said first subtracting means in a differential playback mode.

4. A recording and/or reproducing apparatus in which input video data are grouped into blocks each consisting of a predetermined number of samples and encoded and recorded on a recording medium on a block-by-block basis, and in which the data of each of said blocks, obtained by reproducing the recording medium, is decoded to produce output video data, said apparatus being selectively operable in normal or differential speed playback modes, comprising data correcting means for correcting the data of said blocks by interpolation, filter means for diminishing frequency components produced in horizontal and vertical directions by repetitive occurrences of said blocks, mixing means for mixing the reproduced and decoded video data and the video data supplied from said filter means, and means for selectively supplying the reproduced and decoded video data to said data correcting means and to the mixing means while bypassing the filter means in a normal playback mode or to said filter means and to said mixing means while bypassing the data correcting means in a differential playback mode.

5. A recording and/or reproducing apparatus in which input video data are grouped into blocks each consisting of a predetermined number of samples and encoded and recorded on a recording medium on a block-by-block basis, and in which the data of each of said blocks, obtained by reproducing the recording medium, is decoded to produce output video data, said apparatus being selectively operable in normal or differential speed playback, modes, comprising data correcting means for correcting the data of said blocks by interpolation, filter means for diminishing frequency components produced in horizontal and vertical directions by repetitive occurrences of said blocks, block component detection means for detecting a possible presence of block components in the horizontal and vertical directions of the reproduced and decoded video data, mixing ratio decision means for deciding, based on a detection output from said block component detection means, a mixing ratio of said reproduced and decoded video data and the video data supplied from said filter means, mixing means for mixing, based on the mixing ratio from said mixing ratio decision means, the reproduced and decoded video data and the video data supplied from said filter means, and means for selectively supplying the reproduced and decoded video data to said data correcting means in a normal playback mode or to said filter means, to said block component detection means and to said mixing means in a differential playback mode.

6. A recording and/or reproducing apparatus in which input video data are grouped into blocks each consisting of a predetermined number of samples and encoded and recorded on a recording medium on a block-by-block basis, and in which the data of each of said blocks, obtained by reproducing the recording medium, is decoded to produce output video data, said apparatus being selectively operable in normal or differential speed playback modes, comprising data correcting means for correcting the data of said blocks by interpolation, filter means for diminishing frequency components produced in horizontal and vertical directions by repetitive occurrences of said blocks, still block state detecting means for detecting a still state of image portions within said blocks of the reproduced and decoded video data, mixing ratio decision means for deciding, based on a detection output from said still block state detecting means, a mixing ratio of said reproduced and decoded video data and the video data supplied from said filter means, mixing means for mixing, based on the mixing ratio from said mixing ratio decision means, the reproduced and decoded video data and the video data supplied from said filter means, and means for selectively supplying the reproduced and decoded video data to said data correcting means in a normal playback mode or to said filter means, to said still block state detection means and to said mixing means in a differential playback mode.

7. A recording and/or reproducing apparatus in which input video data are grouped into blocks each consisting of a predetermined number of samples and encoded and recorded on a recording medium on a block-by-block basis, and in which the data of each of said blocks, obtained by reproducing the recording medium, is decoded to produce output video data, said apparatus being selectively operable in normal or differential speed playback modes, comprising data correcting means for correcting the data of said blocks by interpolation, filter means for diminishing frequency components produced in horizontal and vertical directions by repetitive occurrences of said blocks, block component detection means for detecting a possible presence of block components in the horizontal and vertical directions of the reproduced and decoded video data, still block state detecting means for detecting a still state of image portions within said blocks of the reproduced and decoded video data, mixing ratio decision means for deciding, based on a detection output from said block component detection means, a mixing ratio of said reproduced and decoded video data and the video data supplied from said filter means, mixing means for mixing, based on the mixing ratio from said mixing ratio decision means, the reproduced and decoded video data and the video data supplied from said filter means, and means for selectively supplying the reproduced and decoded video data to said data correcting means in a normal playback mode or to said filter means, to said block component detection means, to said still block state detection means and to said mixing means in a differential playback mode.

8. A recording and/or reproducing apparatus in which input video data are grouped into blocks each consisting of odd-numbered samples and blocks each consisting of even-numbered samples, each sample consisting of a predetermined number of pixels, and encoded and recorded on a recording medium on a block-by-block basis, and in which the data of each of said blocks, obtained by reproducing the recording medium, is decoded and the odd-numbered samples and the even-numbered samples are mixed together to produce output video data, comprising data correcting means for correcting the data of said blocks by interpolation, filter means for reducing lattice-shaped frequency components generated by mixing the blocks of said odd-numbered samples and the blocks of said even-numbered samples thereby reducing corresponding interference which otherwise would be present in an output video picture derived from the output video data, and means for selectively supplying the reproduced and decoded video data to said data correcting means while bypassing the filter means in a normal playback mode or to said filter means while bypassing the data correcting means in a differential playback mode.

9. A recording and/or reproducing apparatus in which input video data are grouped into blocks each consisting of odd-numbered samples and blocks each consisting of even-numbered samples, each sample consisting of a predetermined number of pixels, and is encoded and recorded on a recording medium on a block-by-block basis, and in which the data of each of said blocks, obtained by reproducing the recording medium, is decoded and the odd-numbered samples and the even-numbered samples are mixed together to produce output video data, comprising first filter means for reducing latticed frequency components produced by mixing of said odd-numbered samples and said even-numbered samples, and second filter means for reducing horizontal and vertical frequency components generated by repetitive occurrences of mixed blocks consisting of the odd-numbered samples and the even-numbered samples, wherein the video signals reproduced and decoded for a differential speed playback mode being passed through said first filter means and data passed through said first filter means being passed through said second filter means.

10. The recording and/or reproducing means as claimed in claim 9 comprising block component detection means for detecting the possible presence of mixed block components in the horizontal and vertical directions of the video data passed through said first filter means, block still state detection means for detecting a still state of the image portions of the video data passed through said first filter means, mixing ratio decision means for deciding, based on a detection output of said block component detection means and a detection output of said still block state detection means, the mixing ratio of the video data passed through said first filter means and the video data passed through said first filter means and subsequently passed through said second filter means, and mixing means for mixing, based on a mixing ratio from said mixing ratio decision means, the video data passed through said first filter means and the video data passed through said first filter means and subsequently passed through said second filter means.

11. A recording and/or reproducing apparatus in which input video data are grouped into blocks each consisting of a predetermined number of samples and encoded and recorded on a recording medium on a block-by-block basis, and in which the data of each of said blocks, obtained by reproducing the recording medium, is decoded to produce output video data, comprising filter means for diminishing frequency components produced in horizontal and vertical directions by repetitive occurrences of said blocks, wherein said filter means is a horizontal comb filter for reducing frequency components other than those generated in the horizontal direction by repetitive occurrences of said blocks and a vertical comb filter for reducing frequency components other than those generated in the vertical direction by repetitive occurrences of said blocks, and means operable in a differential speed playback mode for subtracting the reproduced and decoded video data passed through one of said horizontal and vertical comb filters at least twice from the reproduced and decoded video data prior to the video data being supplied to said filter means, the resulting data being passed through the other of said horizontal and vertical comb filters at least twice and then subtracted from said resulting data not passed through said other comb filter.

12. The recording and/or reproducing apparatus as claimed in claim 11 further comprising mixing means operable in the differential speed playback mode for mixing reproduced and decoded video data and decoded video data which has passed through said filter means.

13. The recording and/or reproducing apparatus as claimed in claim 11 further comprising block component detection means for detecting a possible presence of block components in the horizontal and vertical directions of reproduced and decoded video data in said differential speed playback mode, mixing ratio decision means for deciding, based on a detection output from said block component detection means, a mixing ratio of the reproduced and decoded video data in said differential speed playback mode and the decoded data which has passed through said filter means, and mixing means for mixing, based on the mixing ratio from said mixing ratio decision means, the reproduced and decoded video data in said differential speed playback mode and the decoded video data which has passed through said filter means.

14. The recording and/or reproducing apparatus as claimed in claim 11 further comprising still block state detecting means for detecting a still state of image portions within said blocks of said reproduced and decoded video data in said differential speed playback mode, mixing ratio decision means for deciding, based on a detection output from said still block state detection means, a mixing ratio of the reproduced and decoded video data in said differential speed playback mode and the decoded data which has passed through said filter means, and mixing means for mixing, based on the mixing ratio from said mixing ratio decision means, the reproduced and decoded video data in said differential speed playback mode and the decoded video data which has passed through said filter means.

15. The recording and/or reproducing apparatus as claimed in claim 11 further comprising block component detection means for detecting a possible presence of block components in the horizontal and vertical directions of reproduced and decoded video data in said differential speed playback mode, still block state detecting means for detecting a still state of image portions within said blocks of said reproduced and decoded video data in said differential speed playback mode, mixing ratio decision means for deciding, based on a detection output from said block component detection means, a mixing ratio of the reproduced and decoded video data in said differential speed playback mode and the decoded data which has passed through said filter means, and mixing means for mixing, based on the mixing ratio from said mixing ratio decision means, the reproduced and decoded video data in said differential speed playback mode and the decoded video data which has passed through said filter means.

16. In a recording and/or reproducing method in which input video data are grouped into blocks each consisting of a predetermined number of samples and encoded and recorded on a recording medium on a block-by-block basis, and in which the data of each of said blocks, obtained by reproducing the recording medium, is decoded to produce output video data from which an output video picture is derived, the improvement comprising selectively correcting the reproduced and decoded data of said blocks by interpolation during a normal playback mode, or during a differential speed playback mode diminishing frequency components of the reproduced and decoded data produced in horizontal and vertical directions by repetitive occurrences of said blocks to thereby reduce a mosaic appearance which otherwise would be present in said output video picture; the step of correcting the reproduced and decoded data by interpolation being carried out without carrying out the step of diminishing said frequency components in the normal playback mode.

* * * * *